United States Patent [19]

Lira

[11] 4,357,749
[45] Nov. 9, 1982

[54] AUTOMATIC MACHINE FOR ASSEMBLING UNIVERSAL ROLLER BEARINGS

[76] Inventor: Heriberto R. Lira, 5150 S. Kostner, Chicago, Ill. 60632

[21] Appl. No.: 210,128

[22] Filed: Nov. 24, 1980

Related U.S. Application Data

[63] Continuation-in-part of Ser. No. 40,493, May 21, 1979, abandoned.

[51] Int. Cl.³ .................... B21D 53/10; B23P 19/04
[52] U.S. Cl. ................................ 29/724; 29/148.4 A
[58] Field of Search ............... 29/724, 725, 149.5 R, 29/148.4 A, 148.4 L, 801, 809; 184/15 A, 15 R, 31

[56] References Cited

U.S. PATENT DOCUMENTS 2,172,145 9/1939 Rehnberg ........................ 29/809
2,222,605 11/1940 Carlson ........................... 29/724

Primary Examiner—Carl E. Hall
Assistant Examiner—V. K. Rising
Attorney, Agent, or Firm—Leo J. Aubel

[57] ABSTRACT

An automatic apparatus for greasing and loading a bearing housing with roller needles whereby the insertion of the bearing housing into a feed cavity in the cylinder feed head of the apparatus initiates the assembly sequence. Grease is pumped into the housing and a plurality of roller needles are pushed simultaneously into the greased housing. The greased and loaded bearing assembly is automatically ejected from the feed cavity and the apparatus turned off.

10 Claims, 7 Drawing Figures

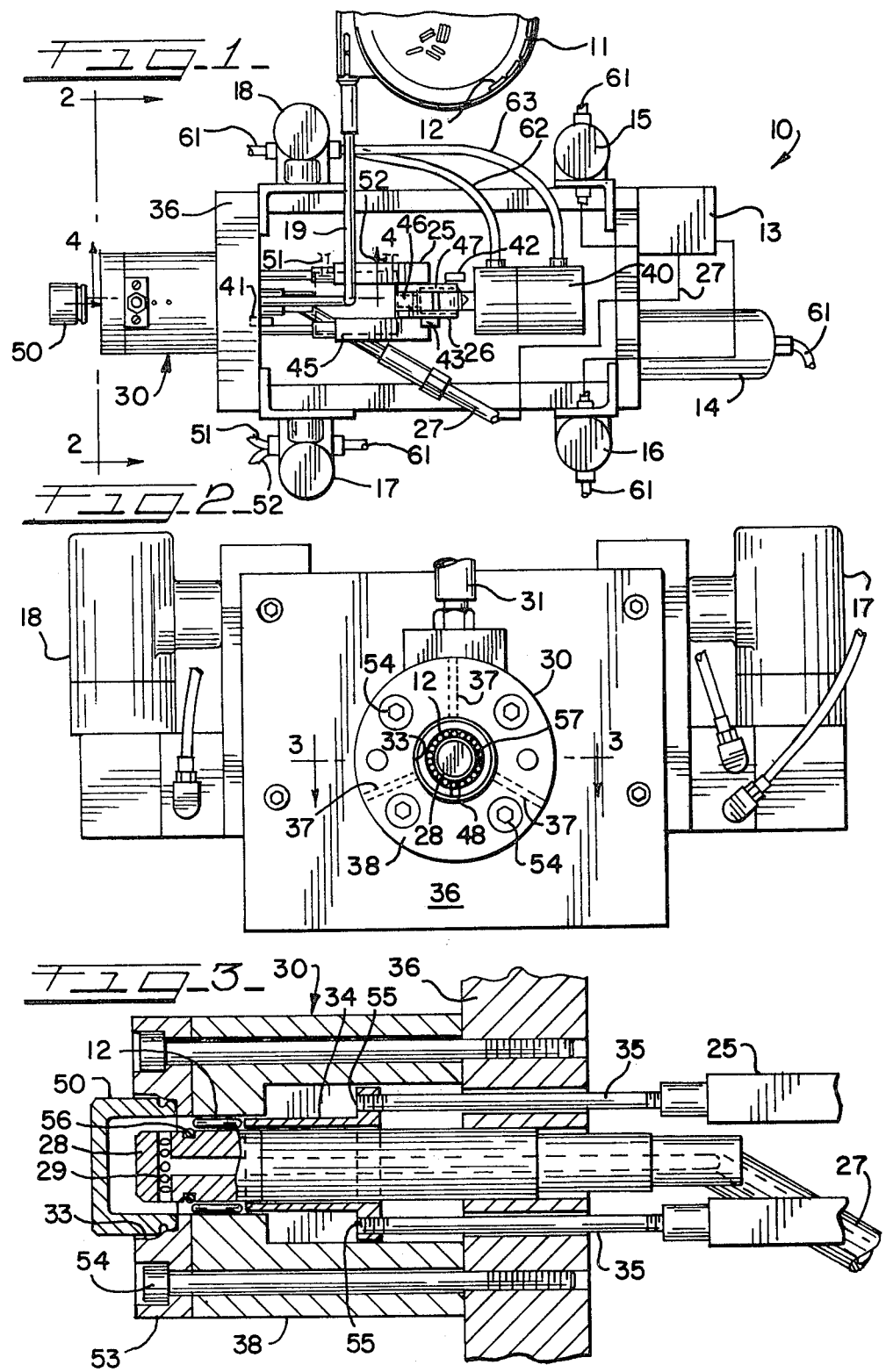

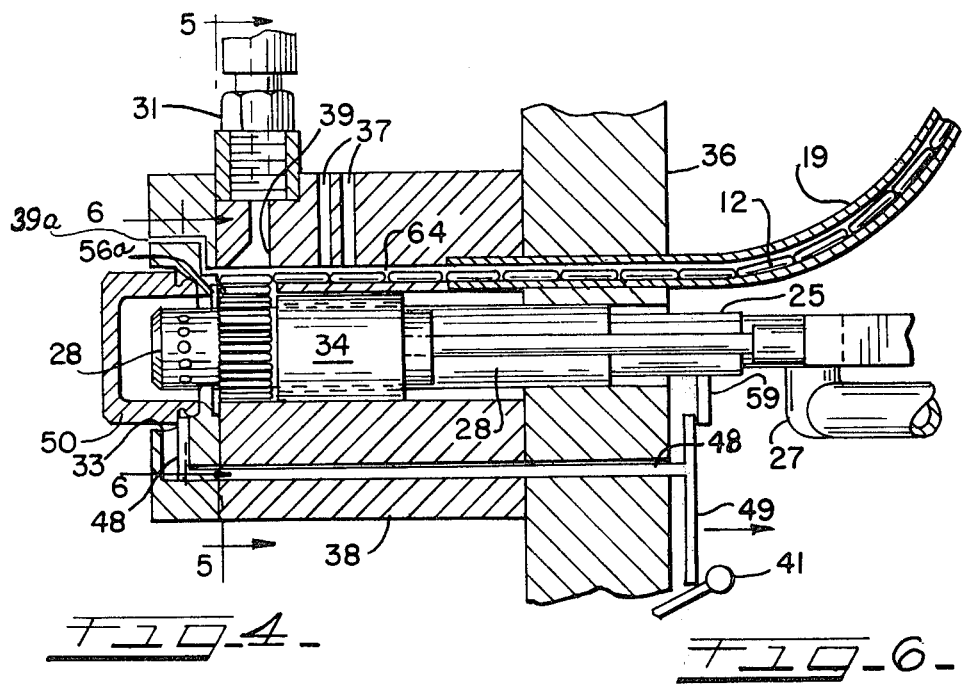
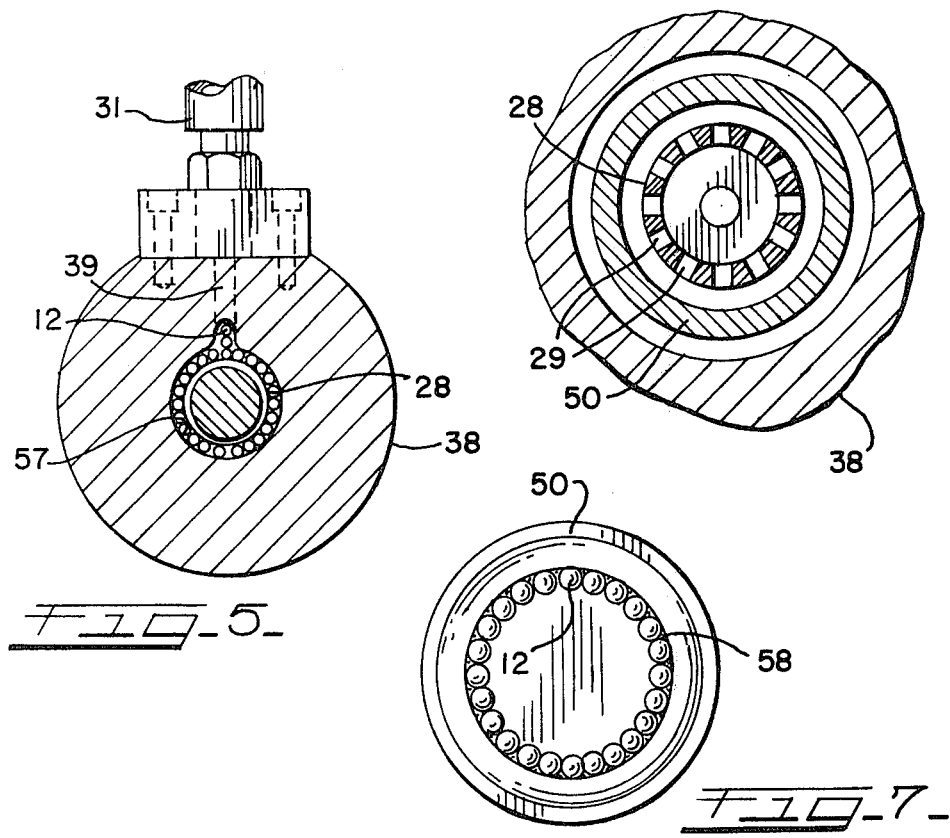

AUTOMATIC MACHINE FOR ASSEMBLING UNIVERSAL ROLLER BEARINGS

This application is a continuation-in-part application of application Ser. No. 40,493 filed in the name of Heriberto R. Lira on May 21, 1979, now abandoned.

BACKGROUND OF THE INVENTION

This application relates to apparatus for assembling bearings and in particular to apparatus for the greasing and insertion of needle pins in bearings.

In the past it has been customery to assembly bearings in two separate operations requiring at least two separate assembly machines to perform such functions. In such operations the bearing housing is first loaded with grease. The greased housing is then manually inserted into a holder and retained there. Roller needles are fed into a closed circular conformation and then pushed by a manually actuated impeller for inserting the entire circle of needles simultaneously into the bearing housing in the desired position. The pin bearings are temporarily retained in place within the bearing housing by the grease.

The above described manner of assembling a bearing by the use of two separate apparatus results in a great loss of time and efficiency during the assembly procedure. In addition two apparatus were needed to perform the function of greasing and loading of roller needles in the bearing housing, thereby increasing the amount of floor space necessary to perform such functions.

Therefore, an object of the subject invention is an apparatus for performing the functions of greasing and loading the roller needles in a bearing housing simultaneously and in one action.

A further object of the subject invention is an apparatus for automatically greasing and loading roller needles in a bearing housing.

These and other objects are attained in accordance with the present invention wherein there is provided a semiautomatic apparatus for greasing and loading roller needles to form universal roller bearings In the apparatus of the subject invention, the roller needles are fed by gravity into the bearing feed head. A bearing housing is inserted into the bearing feed head and actuates the assembly cycle. The grease is forced through a central shaft into the bearing. The roller needles are injected by a blast of air about the central shaft to completely fill a circumferential opening which envelopes the shaft. After the grease is injected into the bearing housing a sleeve about the shaft is driven forward, thereby pushing the roller needles in their circular configuration into the bearing housing. The assembled bearing may be withdrawn from the feed position and another inserted.

DESCRIPTION OF THE DRAWINGS

Further objects of the invention together with additional features contributing thereto and advantages occurring therefrom, will be apparent from the following description of one embodiment of the invention when read in conjunction with the accompanying drawings, wherein:

FIG. 1 is a top view of the subject invention, showing the bearing housing about to be placed in the position for assembly;

FIG. 2 is a side plan view taken along the lines 2—2 of FIG. 1 showing the roller bearings in a loading position in a circular configuration;

FIG. 3 is a cross section taken along the lines 3—3 of FIG. 2 showing the interior of the feed cylinder head;

FIG. 4 is a cross section taken along the lines 4—4 of FIG. 1 showing a view of the cylinder feed head at right angles to that shown in FIG. 3;

FIG. 5 is a cross section taken along the lines 5—5 of FIG. 4 showing the roller needles in position prior to being fed into a bearing housing;

FIG. 6 is a cross section taken along the lines 6—6 of FIG. 4 showing the grease shaft interior;

FIG. 7 is a side plan view of the assembled roller bearing.

DESCRIPTION OF A PREFERRED EMBODIMENT

Referring now to FIG. 1 there is shown a bearing assembling apparatus 10, having a cylinder feed head 30, and a source of air pressure 14, which may be shop air, or the like. Grease is retained under pressure in container 13 for supply to the cylinder feed head 30 on demand. A roller bearing feeding apparatus 11 may be situated above the bearing assembly apparatus 10 for feeding individual roller needle bearings 12 to the cylinder feed head 30 by vibratory motion or the like.

Solenoid valves 15, 16, 17 and 18 automatically control the operation of the assembly apparatus 10. Each of these solenoid valves 15, 16, 17 and 18 are connected to the source of pressurized air 14 by conduits 61. Each solenoid valve 15, 16, 17 and 18 controls the flow of air in the operation of the assembly 10 in response to the activation of microswitches 41, 42 and 43 as will hereinafter be explained.

The cylinder head assembly 30 comprises a hollow cylinder 38 having an end closure 53 (FIG. 3). The end closure 53 and cylinder 38 are secured to the mounting block 36 by suitable bolts 54. Centrally mounted in the interior of the cylinder 38 is grease conduit or shaft 28 (FIGS. 2 & 3). Grease is fed into the grease conduit 28 from the grease reservoir 13 via a plastic conduit 27. Grease conduit 28 has a grease distributing head with openings 29 which provide an equal distribution of grease about the circumferential periphery of the grease conduit 28. (FIG. 6) As shown in FIGS. 3 and 4, the grease conduit extends partially into a bearing housing when inserted for assembly. The grease is thus injected into the housing, as will be described.

A sleeve or bushing 34 is mounted for reciprocal travel on the grease conduit 28 within the cylinder head 38. The sleeve 34 is driven in this reciprocal travel by drive rods 35 secured in ears 55 of the sleeve 34 in a manner which will be explained. Roller needle bearings 12 travel into the cylinder head 38 for positioning in space or opening 57 about the periphery of the grease conduit 28. An O-ring 56 as in FIG. 3 or a suitable flexible washer 56a as in FIG. 4, and the front end of the sleeve 34 retain the needle bearings in the correct position about the grease conduit 28 until the loading sequence begins. While both the O-ring 57 and washer 56A are satisfactory, the washer 56A has been found to be more durable.

As stated, the individual needle bearings 12 are fed from an appropriate source such as vibratory bowl 11 into conduit 19 for delivery into passageway 64. The individual roller bearings 12 drop into the peripheral space 57 about the grease conduit 28. To assist in this drop and to cause each roller bearing to drop quickly in the opening 57, a blast of air is provided through conduit 39 from a metered source of air pressure 31. By this arrangement an onrushing flow of air, adjusted to the desired flow rate by appropriate adjusting means 31 encounters each roller bearing needle 12 and forces it into opening 57 on either side of the conduit 28. When the entire periphery about the grease conduit is full with roller bearings, the movement of succeeding roller bearings stops, resting on the last roller bearing to enter the peripheral space 57 resulting in the arrangement of roller bearings, as shown in FIGS. 4 and 5. It was found that when the full complement of roller bearings needles 12 filled the peripheral opening 57 as indicated in FIG. 4, the air under pressure in conduit 39 would tend to force the bearings 12 backward (to the right in FIG. 4) in conduit 19, and thus interfere with the proper feed of the roller bearing needles 12. An air pressure relief vent 39a was thus provided to communicate with opening 57 to prevent this problem; that is when opening 57 is full of roller needle bearing 12 the air under pressure will flow out through vent 39a and not interfere with the roller bearing needle 12 feed. Sleeve 34 is then moved in a forward direction to push the circle of roller bearing needles past the flexible washer 57 into the previously greased bearing housing 50. After the roller needles are inserted into the housing, the sleeve 34 continues its movement forward, shutting off the assembly cycle and ejecting the assembled bearing from the feed cavity 33 in a manner which will be described.

Accordingly, the bearing housing is first greased and then loaded with roller bearings through a control means or apparatus comprising a plurality of microswitches tripped sequentially by a contact element to actuate associated pneumatic valves. While a specific control means is described below, such apparatus are considered within the ordinary skill of a mechanic and, as such, are not per se limiting of the subject invention.

The manner of operation of the assembly apparatus 10 is best explained with reference to FIGS. 1 and 4. An assembly sequence is initiated by the insertion of a bearing housing 50 into the feed cavity 33. Insertion into the filling cavity pushes control lever 48 backwards. Control lever 48 is connected to rear control member or trip element 49 and thus on rearward movement of control lever 48, control lever 49 also moves to the rear, contacting and tripping microswitch 41 (FIG. 4). Microswitch 41 actuates associated solenoid valve 17 which is connected by conduits 51 and 52 to pneumatic drive control means 45. When the trip element 49 contacts microswitch 41, (FIG. 4) solenoid valve 17 creates an airflow through conduit 51, actuating shaft 46 to move backwards (to the right in FIG. 1) causing contact by the contact element 47 on shaft 46 with microswitch 43. The microswitch 43 is connected to solenoid valve 16 for actuation of grease supply means in container 13 for providing the flow of grease through conduit 27 into the cylinder feed head 30. Meanwhile shaft 46 and the contact element 47 continue its progress to the right contacting microswitch 42. Thus, switches 42 and 43 are contacted sequentially. By the contact of element 47 with the microswitch 42, the flow of grease through conduit 27 into the cylinder feed head 30 ceases. Concurrently, the feed cycle is initiated since when microswitch 42 closes, it also actuates solenoid valve 18 to power the pneumatic drive means. Solenoid valve 18 provides a surge of air through conduits 63 to the pneumatic drive means 40 thereby moving shaft 46 and the connecting rods 25 and 35 forward (to the left in FIG. 3). Sleeve 34, attached to drive rod 35 as described above, pushes the roller bearings 12 out of opening 57 into the bearing housing 15. The travel of the sleeve 34 does not stop with the insertion of the roller needles 12 into the housing 15, but continues outwardly to eject the now loaded and greased bearing assembly. A container (not shown) may be placed beneath the cylinder feed head 38 for collecting the ejected bearing assembly. An assembled bearing assembly, loaded and greased, is shown in FIG. 7.

Mounted on drive rods 25 is downwardly depending extension 59 (FIG. 4). When drive rod 25 is moving towards the completion of its feed stroke, extension 59 contacts an upper end of contact element 49, driving it foward and causing a disengagement of contact element 49 with microswitch 41. This action closes solenoid valve 17 which provides a flow of air through conduit 52 to pneumatic drive control means 45 and drive contact element 47 to the left to cause it to disengage from microswitch 42. When contact element disengages from microswitch 31, microswitch 41 causes pneumatic valve 18 to supply a rush of air through conduit 62 to pneumatic drive means 40 and drive the feed assembly and sleeve 34 to the right to its rearmost position.

The feeding and greasing assembly 10 is now ready to grease and load another bearing housing 50. Actuating contact member 48 is extended and in a position for initiating contact with the bearing housing and actuating the entire cycle.

As mentioned above, the foregoing operation is commenced upon insertion of the bearing housing 50 into the feed cavity 33. Pleacement of the bearing housing in the cavity provides contact with actuation means 48 to initiate the greasing and loading sequence. The present invention provides an apparatus and method to automatically grease and load the bearing housing 50 with roller bearing 12 in a matter of seconds and then automatically eject the assembled housing whereby at the end of a sequence or cycle the apparatus is ready for another cycle of greasing and loading a bearing housing.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:

1. An apparatus for sequentially greasing a bearing housing and loading a plurality of needle bearings in said bearing housing, said apparatus comprising a feed head having a same stationary greasing and loading position, grease feeding means for selectively injecting grease under pressure into said bearing housing, a bearing feed means for serially feeding bearings into said feed head, a channel for receiving a plurality of bearings juxtaposition to one another and in a circular pattern, bearing drive means mounted for reciprocating movement from a first position spaced from the bearings received in said channel to a second position engaging and driving said bearings into said housing, first means actuatable by the positioning of said bearing housing in the greasing and loading position of said feed head for activating said grease means to inject grease into said bearing housing, second means actuatable after activation of said grease means to deactivate said grease means and stop injection of grease into the bearing housing, said second means actuatable to activate said bearing drive means to move from its first position to its second position to engage and drive said needle bearings into said housing.

2. Apparatus as in claim 1 wherein said first means comprising a first electrical switch actuatable by insertion of the bearing housing in said greasing and loading position, a reciprocable shaft, and shaft drive means energizable by said first switch to move said shaft in a first direction to actuate a second electrical switch to activate said grease feeding means.

3. Apparatus as in claim 2 wherein said second means comprise a third electrical switch spaced from said second electrical switch and being actuatable by movement of said shaft in said first direction at a point in time subsequent to the actuation of said second electrical switch to deactivate said grease means.

4. Apparatus as in claim 3 wherein said second means comprise means to activate said bearing drive means to move from its first position to its second position concurrently as said grease means are deactivated.

5. Apparatus as in claim 4 wherein as said bearing drive means moves into its second position it pushes the bearing housing out of said feed head.

6. Apparatus as in claim 1 wherein said grease feeding means includes a grease conduit extending from said feed head, said channel for receiving the plurality of bearings is a peripheral channel formed about said grease conduit, and said bearing drive means comprises a sleeve positioned in said channel and around said conduit.

7. Apparatus as in claim 6 further including a means for directing a flow of air into said peripheral channel, said bearings being fed by gravity to a position above said peripheral channel where said flow of air contacts the individual bearings and quickly drives said bearing into said peripheral channel.

8. Apparatus as in claim 1 further including air vent means for venting the air from said channel.

9. Apparatus as in claim 1 wherein said bearings are needle bearings having a relative long axial length and are pushed through a feed conduit single-file substantially along their logitudinal axis, an air flow means, a peripheral channel about said grease conduit, said air flow means directing a blast of air against each bearing perpendicular to its logitudinal axis to force each of said bearings individually into said peripheral channel in a direction substantially perpendicular to said feed conduit, and filling said peripheral channel with said plurality of bearings by the successive feeding of said bearings.

10. Apparatus as in claim 9 further including means for enabling said air flow to vent out from said channel.

* * * * *